United States Patent [19]

Shorthouse

[11] Patent Number: 5,637,154
[45] Date of Patent: Jun. 10, 1997

[54] METHOD AND APPARATUS FOR REMEDIATING SOIL

[76] Inventor: Barry O. Shorthouse, 1313 Hollywood Dr., Monroe, Mich. 48161

[21] Appl. No.: 579,465

[22] Filed: Dec. 27, 1995

Related U.S. Application Data

[63] Continuation of Ser. No. 205,871, Mar. 3, 1994, abandoned.

[51] Int. Cl.$^6$ ................................................. A62D 3/00
[52] U.S. Cl. ........................... 134/25.1; 134/2; 134/34; 134/42; 405/258; 588/205; 588/900
[58] Field of Search ................................. 405/128, 129, 405/431, 258, 263; 134/2, 40, 42, 25.1, 34; 588/205, 245, 252, 901

[56] References Cited

U.S. PATENT DOCUMENTS

| | | | |
|---|---|---|---|
| 4,978,508 | 12/1990 | Hansen et al. | 422/186.08 |
| 5,045,240 | 9/1991 | Skriba et al. | 252/626 |
| 5,128,068 | 7/1992 | Lahoda et al. | 252/626 |
| 5,134,078 | 7/1992 | Sieksmeyer et al. | 435/262 |
| 5,161,326 | 11/1992 | Weirich et al. | 423/DIG. 20 |
| 5,223,147 | 6/1993 | Rosenstock et al. | 134/40 |
| 5,228,921 | 7/1993 | Peterson | 134/42 |
| 5,248,098 | 9/1993 | Schade | 134/25.1 |
| 5,268,128 | 12/1993 | Lahoda et al. | 209/2 |
| 5,302,287 | 4/1994 | Lusack | 134/42 |
| 5,340,406 | 8/1994 | Fearon | 405/128 |
| 5,368,411 | 11/1994 | Lusack | 405/128 |

*Primary Examiner*—Gary P. Straub
*Attorney, Agent, or Firm*—Harness, Dickey & Pierce

[57] ABSTRACT

A method and apparatus for treating contaminated soil by breaking up the contaminated soil and separating the soil by particle size and passing the smaller sized soil particles though a series of soil washes in a first direction while directing the washing water in a second direction which is opposite to the first. The apparatus is preferably portable and provides for a continuous cleaning of the soil and recycling of the water in order to allow the decontaminated soil to be immediately returned to the ground.

9 Claims, 3 Drawing Sheets

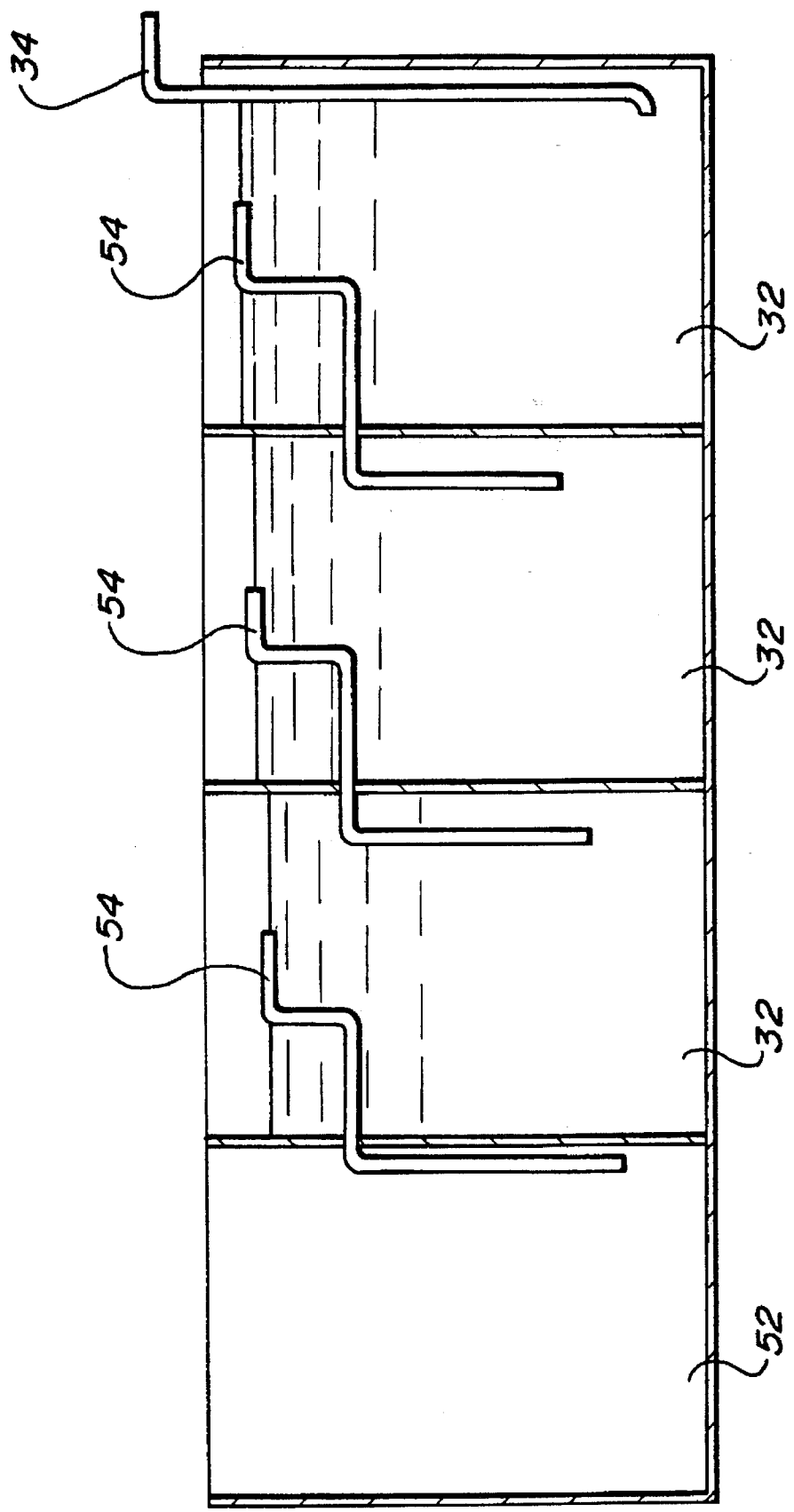

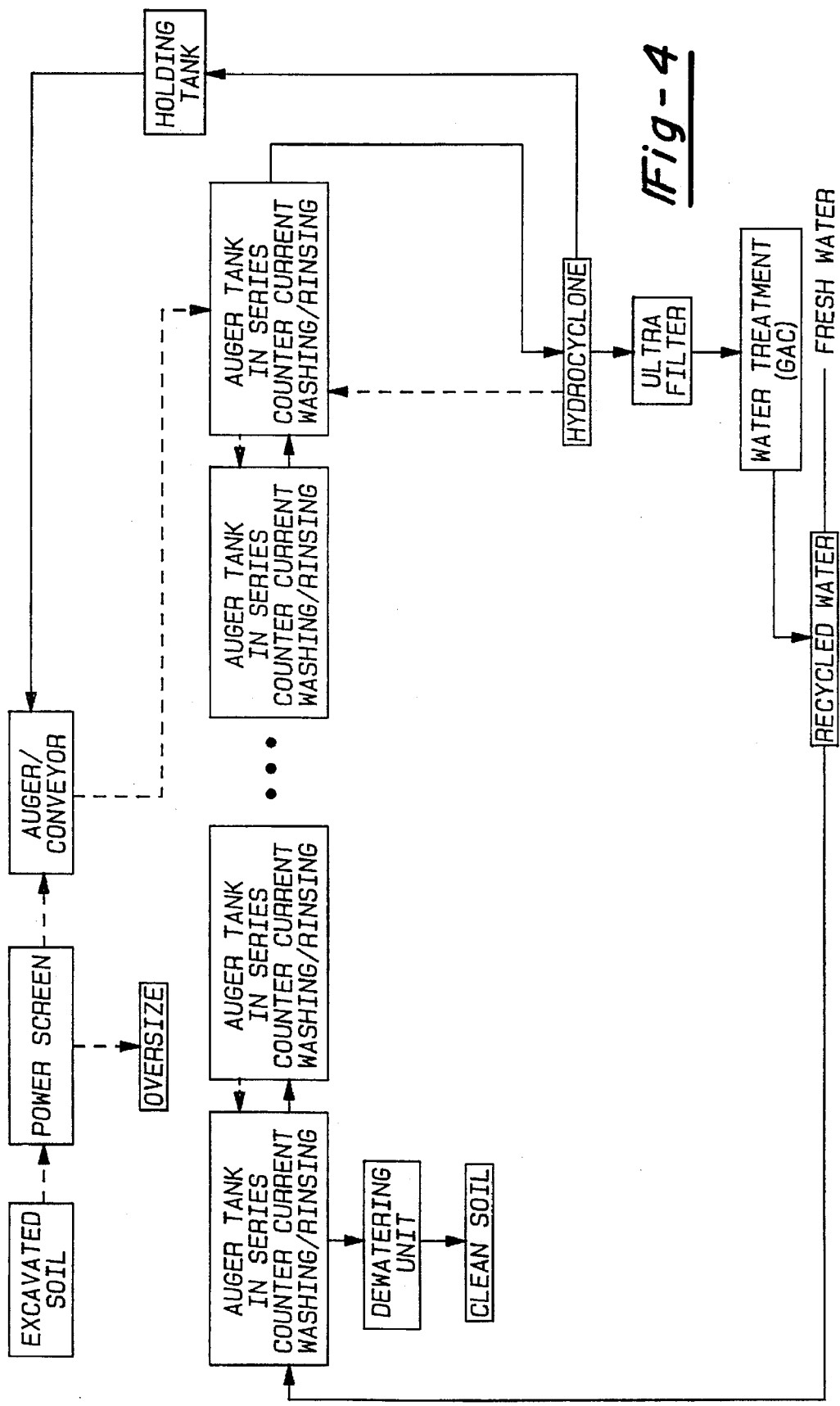

METHOD AND APPARATUS FOR REMEDIATING SOIL

This is a continuation of U.S. patent application Ser. No. 08/205,871, filed Mar. 3, 1994, now abandoned.

FIELD OF THE INVENTION

The present invention relates to a method and an apparatus for removing soil contaminants. More particularly, the present invention relates to a method and apparatus for removing soil contaminants by first separating the soil particles and then subjecting the particles to a series of soil washing operations.

BACKGROUND OF THE INVENTION

In recent years there has occurred at all levels of government the enactment of laws and regulations directed toward protecting and cleaning up the environment. One problem to which these environmental laws have been directed is the prevention and clean up of soil which has become contaminated through intentional and unintentional spilling of a variety of chemical wastes by individuals, businesses and industries. The tremendous increase in the manufacturing segment of our economy in the last several decades have contributed a substantial amount of contamination to the environment. For example, the many service stations providing fuel and other petroleum products and related services for vehicles having resulted in the spillage of materials containing hydrocarbons that contaminate the soil. The operation of and waste disposal by chemical and petro chemical plants has resulted in similar soil contamination. Also, accidental spills resulting from truck and rail transport accidents contaminate the soils on public and private right of ways. If these contaminants are not removed from the soil, they eventually may leach into the groundwater and create further environmental problems that are difficult if not impossible to remedy. In order to properly protect the environment from further damage, it is essential that these contaminants be removed promptly upon discovery, and many of the laws at local, state and federal levels are forcing landowners and others to take all possible steps to remove these contaminants.

At the present time, contaminated sites are subject to stringent regulations regarding the removal and disposal of contaminated soil. Soil known to be contaminated often must be excavated, and the contaminated soil transported to landfills which have been designated to receive the contaminated soil. The soil excavated from the original contaminated site must of course be replaced with soil that is contamination free. This excavation and replacement procedure is an expensive and time consuming process. More importantly, this procedure for cleaning up the environment does not solve the contamination problem, but merely moves the contaminated soil from one site to a different site, a designated land fill, where it will hopefully do less harm. However, the overall environment remains contaminated, and in the process of removing the contaminated soil and transporting it to these designated landfills, the environment is exposed to further contamination. More importantly, the soil remains in a contaminated state, and poses future problems for the area of the landfill and the surrounding environment. Moreover, because of the limited number of available sites for depositing these hazardous substances, and because those owning property in the vicinity of the sites vigorously object to them, the replacement solution to the problem is less satisfactory and may in the long range create more problems than it solves. Other treatment methods for removing contamination from soils have proven to be even more expensive, intractable or ineffective.

Thus, there is a need for a method of cleaning the contaminated soil at the original contaminated site and returning the cleansed soil back to the ground in a contamination free state. The method of cleansing the soil should be considerably less costly than the known prior art methods to encourage individuals to clean up their property and the method should remove the contaminants from the soil not simply removing the soil and transporting it to another disposal site without eliminating the contamination from the soil.

SUMMARY OF THE INVENTION

The present invention provides the art with a method and an apparatus for treating the contaminated soil on site. The apparatus can be made portable to move from site to site or the apparatus may be permanently located at a specific site. According to the preferred embodiment of the invention, the contaminated soil is excavated and fed into a hopper of an apparatus where it is screened and passed through a feed auger. This serves to break the material into small particles which are then passed to a series of soil washing operations. The small particles are passed between soil washing operations by additional feed augers which continue to break the material into discrete particles. The number of soil washing operations and the speed of travel of the soil through the soil washing operations can be varied to particularly suit the amount and the type of contaminants present in the soil. The cleansing water may then be rerouted through a cleaning operation and recycled to the soil washers for continued soil cleansing.

Other advantages and objects of the present invention will become apparent to those skilled in the art from the subsequent detailed description, appended claims and drawings.

BRIEF DESCRIPTION OF THE PREFERRED EMBODIMENT OF THE INVENTION

In the drawings which illustrate the best mode presently contemplated for carrying out the present invention:

FIG. 3 is a partial side elevational view, partially in cross section, showing the flow of cleaning water between tanks of the apparatus shown if FIG. 1; and FIG. 4 is a schematic diagram illustrating the sequence of steps of the present invention for both the movement of soil and the movement of cleansing water.

DETAILED DESCRIPTION OF THE PREFERRED EMBODIMENT OF THE INVENTION

Figure 1:
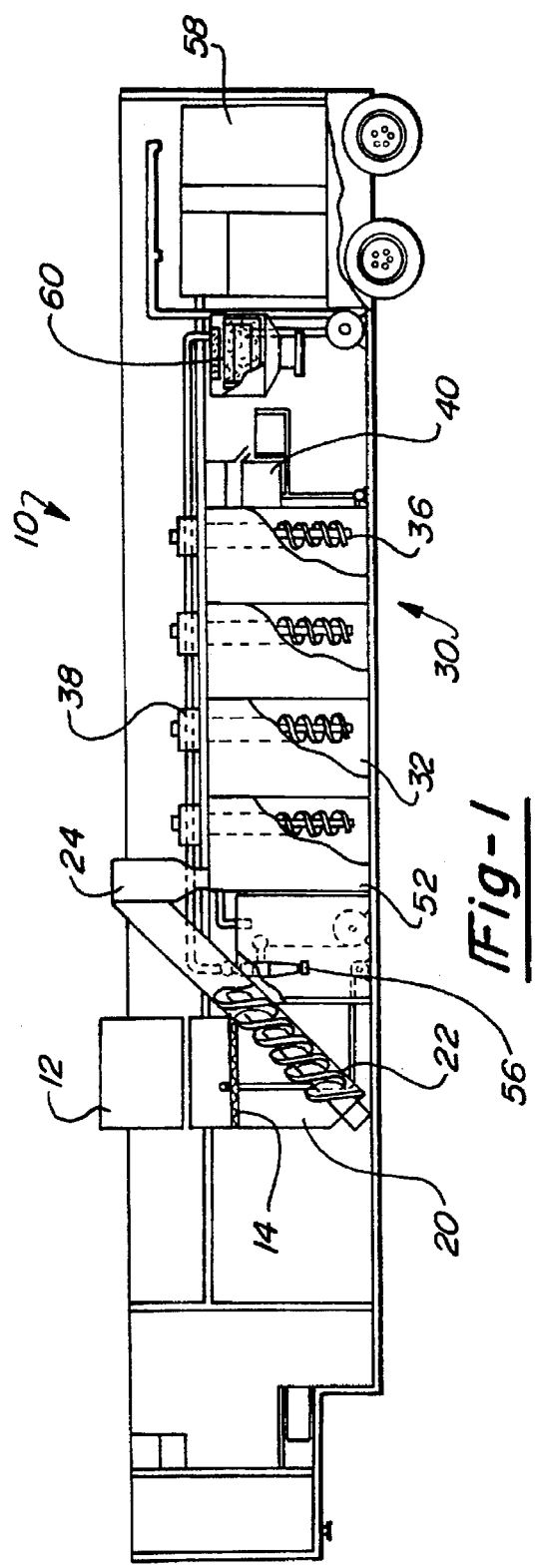
FIG. 1 is a side elevational view, partially in cross section of an apparatus constructed according to the principles of the present invention.

The primary use for the method and apparatus of the present invention is for the on-site elimination of environmental contaminants from the soil. The apparatus illustrated in the drawings and described hereinafter is preferably a mobile apparatus that is mounted on the chassis of a self-propelled vehicle, a trailer frame, railway car or any other means for easily moving the apparatus from place to place. However, it is to be understood that the principles of the invention can be employed in connection with an apparatus that is installed at a stationary site such as a conventional landfill.

Figure 2:
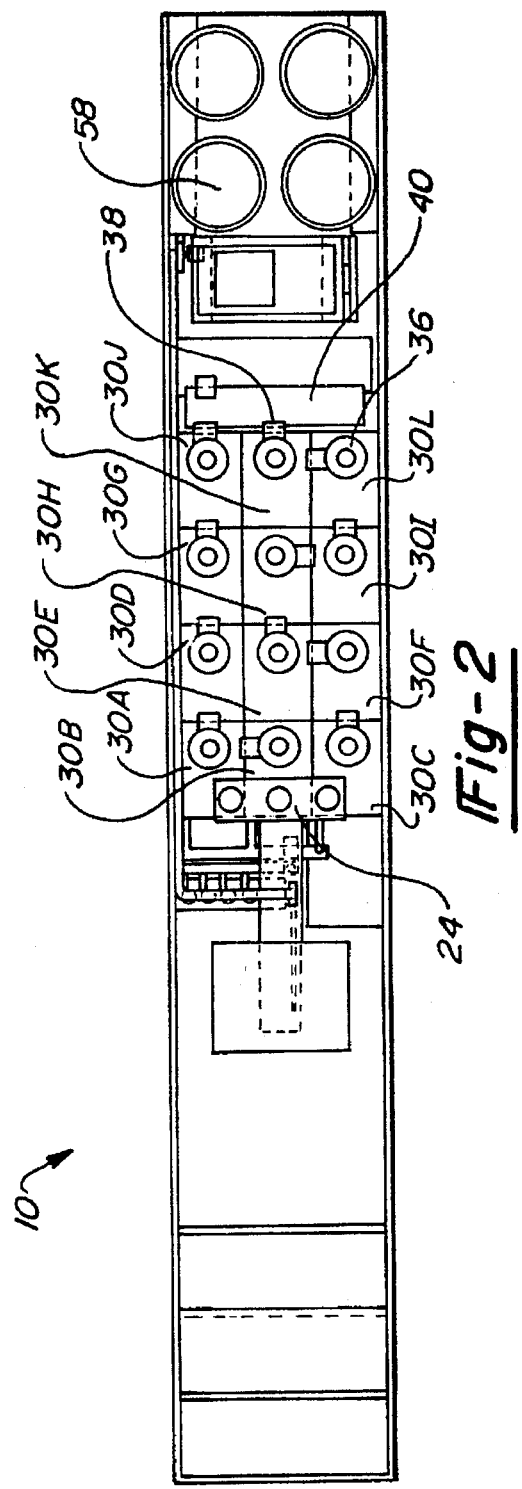
FIG. 2 is a top plan elevational view of the apparatus shown in FIG. 1.

Referring now to the drawings in which like reference numerals designate like or corresponding parts throughout the several views, there is shown in FIGS. 1 and 2 a high intensity soil cleansing apparatus embodying the principles of the present invention which is designated generally by the reference numeral 10.

Contaminated soil which has been excavated from the ground is delivered to apparatus 10 via a hopper 12 which contains a size limiting screen 14 that will separate large particles, stones and other foreign matter from the smaller particles of soil. The purpose for separating the particles by size is that the soil contamination adheres to the surface of the soil particles. The amount of soil contamination is thus proportional to the amount of surface area of the soil particles. Because smaller particles have the largest surface area per unit weight, a majority of the soil contamination is located on the smaller particles (clays and silts). Adsorption is a surface area phenomena and consequently most of the contaminants reside on the smallest particles. It is thus essential to expose the surface of the smallest particles to the extracting water, or fluid, as on a weight basis, the majority of the total surface area of the soil is associated with the smallest particles. As a rule of thumb, 99% of the contamination resides on the 1% smallest particles. The larger particles, stones and other foreign matter may be rinsed, de-watered and discharged if desired.

The smaller particles of soil that pass through screen 14 are delivered by gravity into a first reactor 20 where they are mixed with water. The water which is used for the soil washing travels in a direction which is counter-current or opposite to the direction that the soil travels. The water is cycled through the soil and then through a water cleansing process which will be described later herein. The soil and water mixture within reactor 20 is transported upward by a screw type auger 22. As the soil is transported up auger 22, the water begins to drain from the soil and returns to reactor 20 thus helping to somewhat de-water the soil and improve the cleansing effect of the water in subsequent reactors. The once washed soil travels up auger 22 and is delivered by a chute 24 to a plurality of reactors 30. In order to understand the operation of apparatus 10, the plurality of reactors 30 have been designated 30A, 30B, 30C, 30D, 30E, 30F, 30G, 30H, 30I, 30J, 30K and 30L individually, but will be referred to collectively as reactors 30.

As illustrated, soil cleansing apparatus 10 includes a total of twelve reactors 30. While apparatus 10 is shown having twelve reactors 30, it is within the scope of the present invention to have more of fewer reactors 30. Each reactor 30 is similar in that it includes a tank 32 which is provided with a source of water 34. A screw type auger 36 moves the soil from the lower portion of tank 32 to the upper portion of tank 32 where a chute 38 directs the soil to an adjacent reactor 30. Depending on the number of soil washing stages required, chute 24 in conjunction with the plurality of chutes 38 are positioned to direct the flow of soil through the appropriate number of reactors 30. As can be seen in FIG. 2, if chute 24 delivers the soil to reactor 30B, the plurality of chutes 38 will deliver the soil from reactor 30B to reactor 30A, to reactor 30D, to reactor 30G, to reactor 30J, and finally to a holding tank 40. This would represent a total of five washing stages. If chute 24 delivers the soil to reactor 30C, the plurality of chutes 38 will deliver the soil from reactor 30C to reactor 30F, to reactor 30E, to reactor 30H, to reactor 30I, to reactor 30L, to reactor 30K, and finally to storage tank 40. This would represent a total of seven washing cycles. As can be appreciated, chute 24 in conjunction with the plurality of chutes 38 can be positioned to provide a variety of numbers of washing cycles for the contaminated soil.

As chute 24 and each chute 38 delivers the soil to each of the plurality of reactors 30, water flow from the source of water 34 within each tank 32 creates a high degree of turbulence to improve the absorption of the contaminants by the water and also helps to cause impact between the individual soil particles to aid in the transfer of contaminants from the soil to the water as well as helping to further reduce particle size by increasing the rate of shear between the soil particles. The various screw type augers 36 operate to transfer the soil between adjacent reactors 30 as well as to create a high rate of shear between the particles to insure the breaking up of the soil particles into their smallest size. Augers 36, similar to auger 22 extend above the level of water within tank 32 and thus allow a significant amount of water to drain from the soil prior to delivering the soil to the adjacent reactor 30. This drainage or "dewatering" of the soil greatly improves operating efficiency of apparatus 10 as will be described later herein.

Once the soil has been delivered to holding tank 40, the soil can be returned to the ground as it is now free of contaminants. In order to insure contamination free soil, the contamination level of the soil within holding tank 40 can be monitored and appropriate adjustments can be made to the speed of the soil, flow of the water and number of reactors 30. If any soil within holding tank 40 is outside of a predetermined contamination level, it can simply be recycled through apparatus 10 after the appropriate adjustments have been made.

As stated above, the flow of water is opposite to or counter current to the flow of soil within apparatus 10. Water is delivered to the final reactor 30 in the sequence of reactors 30 being used. For the five stage washing operation described above, water would flow to reactor 30J, to reactor 30G, to reactor 30D, to reactor 30A, to reactor 30B and finally to a storage tank 52. Similarly, for the seven stage washing operation described above, water would flow to reactor 30K, to reactor 30L, to reactor 30I, to reactor 30H, to reactor 30E, to reactor 30F, to reactor 30C, and finally to storage tank 52. The water travel between reactors 30 through a plurality of transfer pipes 54. Transfer pipes 54 are arranged such that each subsequent reactor 30 contains a slightly lower level of water (approximately two inches in the preferred embodiment) as shown in FIG. 3. This continued lowering of the water level provides a water gradient in the direction of the water flow (to the left in FIG. 3) thus allowing the water to travel from tank to tank.

A portion of the water which is located within tank 52 is delivered to reactor 20 for rinsing of the incoming contaminated soil. An additional portion of water within tank 52 is pumped through a hydro-cyclone separator 56 for separation of the fine particles of soil and then the water is pumped to a group of active carbon and/or ion exchange resin columns 58 for removal of the contaminants and adjustment of the pH level if required. If necessary, a micro filter 60 may be used to remove the ultra fine particles of soil from the water. Once the water has been decontaminated by the active carbon and/or the ion exchange resin columns 58, the water is returned to the soil cleansing process. The active carbon and/or ion exchange resin columns 58 can be treated by methods known well in the art to remove the contaminants and thus this can also be returned to the soil cleansing process.

FIG. 4 is a schematic flow diagram illustrating the preferred embodiment of the present invention. In FIG. 4, the soil flow is indicated by the dashed lines while the counter-current water flow is illustrated by the solid lines.

Prior to setting the various positions of each of the plurality of chutes 38, it must be determined the number of stages which must be used in order to de-contaminate the soil. Soil washing is a form of leaching where contaminants are desorbed from the surface of the soil particles rather than extracted from the interior. The process is somewhat simpler than conventional leaching as the extracted chemicals do not reside inside the soil particles but only on their surface. The contaminants may be directly attached to the soil particle or itself absorbed in a layer of organic material covering the surface of the soil.

The physics, mathematics and physical chemistry of the unit process of leaching is well established, the mechanisms and rates predictable and the unit operation (the physical aspects) widely used in many industries. The main difficulty in soil decontamination is that initially, the particle size and shape distribution is not known and, or course, cannot be chosen. Furthermore, the adsorption isotherms of individual contaminants are difficult to predict as they depend on the nature of the compounds adhering to the surface of the soil particles.

However, with the appropriate physical and chemical analysis, the use of high shear rates and counter-current flow equipment, all but a very few of the commonly occurring contaminants may be removed to levels approaching the non-detectable.

In most counter-current flow situations, and in the counter-current flow of apparatus 10, the soil, and its occluded water, flow in a direction opposite to the flow of water extracting the contaminant. In order to derive the maximum benefit from this process, an equilibrium between these two phases must be attained or closely approached throughout the plurality of reactors 30. The transfer of contaminant from the surface of the particles to the water is principally governed by diffusion mechanisms in both the boundary layer close to the surface of the larger particles or agglomerations and within clumps of small particles themselves. The greater the rate of shear, the more the clumps of small particles will be reduced to individual particles, exposing their surfaces to the extraction water. This high rate of shear for the plurality of reactors 30 is provided by the turbulence of the water flow within tanks 32 and the plurality of screw type augers 36.

It is convenient, as with many unit operations, to describe the space required for this equilibrium attainment as a theoretical transfer unit and express it in the dimension of a distance such as the height of a transfer unit or the height of a theoretical plate. Many expressions have been derived to quantify mathematically the number of "units" and the performance that can be expected. The preferred embodiment of the present invention uses the Fenske Equation to determine the "units" or the number of stages required. The Fenske Equation states:

$$n = \left[ \log\left( 1 + \frac{(R-1)}{f} \right) / \log R \right] - 1$$

where:
R=The ratio of extracting water to the water retained in the soil
f=The reduction required
n=The number of stages An equation that follows from the Fenske Equation that is helpful in approximating the concentration of the soil contamination after a specified number of stages is:

$$p = p°/(R+1)^n$$

where:

p=The approximate concentration at the nth stage
p°=The original concentration

While the above equation can be utilized to approximate the concentration level after a specified number of stages, the Fenske Equation above is the controlling equation in determining the number of stages required. Thus, it can easily be seen that a massive reduction in the contamination concentration (over 100,000 times) may be achieved with R=10 and n=5.

The rheological, mixing and separation processes area controlled by the soil particle shape and size. The surface area controls the amount of adsorbed contaminant and it follows that when soil washing is considered, a full understanding of the particle size and shape distribution is essential. Other necessary factors include the solubility of the contaminants in water and the chemical reactions which the contaminants may undergo. Ionic strength, pH, surface charges and other physiochemical properties also play an important role.

Essentially, effective soil washing requires a full characterization of the soil and the pollutant. Given the type of contaminant, its concentration, the levels of remediation required and the particle size distributions, the high intensity soil cleansing apparatus 10 of the present invention is a viable, predictable and economic way of cleaning up the overwhelming majority of contaminated sites.

EXAMPLE 1

Assuming the initial condition is taken as processing 1 ton per minute of soil having a total petroleum hydrocarbon (TPH) content of 1,000 parts per million (ppm). The following table can be derived from the Fenske Equation shown above to determine the number of stages required to reduce the contamination to the various levels.

| | f | | | |
|---|---|---|---|---|
| R | $10^{-2}$ | $10^{-3}$ | $10^{-4}$ | $10^{-5}$ |
| 2.5 | 4.47 | 6.98 | 9.49 | 12.00 |
| 5.0 | 2.72 | 4.15 | 5.58 | 7.01 |
| 7.5 | 2.21 | 3.35 | 4.50 | 5.64 |
| 10.0 | 1.95 | 2.95 | 3.95 | 4.95 |

Thus it can be seen that using a ratio of overflow to underflow water (R) of 10 it would take three stages to reduce the contamination to 1 ppm. If the ratio R were reduced to 2.5 then seven stages would be required to reduce the contamination to 1 ppm.

The concentration of the above example at any stage may be approximated from the second equation given above.

| | n | | | | | | |
|---|---|---|---|---|---|---|---|
| R | 0 | 1 | 2 | 3 | 4 | 5 | 6 |
| 2.5 | 1000 | 285 | 81.6 | 23.3 | 66.6 | 1.90 | 0.54 |
| 5.0 | 1000 | 166 | 27.7 | 4.63 | 0.77 | 0.13 | 0.2 |
| 7.5 | 1000 | 117 | 13.8 | 1.62 | 0.19 | 0.02 | 0.00 |
| 10.0 | 1000 | 90.9 | 8.26 | 0.75 | 0.06 | 0.00 | 0.00 |

The value of R in the above equations can be increased without increasing the overflow by de-watering the soil between stages if desired. In addition, the use of a surfactant will also reduce the required value of R.

While the above detailed description describes the preferred embodiment of the present invention, it should be understood that the present invention is susceptible to modification, variation and alteration without deviating from the scope and fair meaning of the subjoined claims.

What is claimed is:

1. A method for removing non-water soluble hydrocarbon contaminants from contaminated soil, using only water, said method comprising the steps of:

excavating said hydrocarbon contaminated soil;

sorting said hydrocarbon contaminated soil by particle size into large soil particles and small soil particles;

supplying said small soil particles to at least one soil washing tank;

supplying only water to said at least one soil washing tank to mix with said small soil particles;

creating turbulence within said at least one soil washing tank to increase the rate of shear between said small soil particles within said at least one washing tank to improve the absorption of said hydrocarbon contaminants by said water to provide decontaminated soil such that all washing is done by said water and essentially all hydrocarbon contaminants are removed from the contaminated soil during said washing; and removing said decontaminated soil from said at least one soil washing tank.

2. The method according to claim 1 wherein said step of creating turbulence within said at least one soil washing tank reduces the amount of time for the contaminant level in said water and the contaminant level in said small soil particles to reach a general equilibrium.

3. The method according to claim 1 wherein said step of supplying said small soil particles to at least one soil washing tank comprises serially supplying said small soil particles to a plurality of soil washing tanks.

4. The method according to claim 3 wherein said step of supplying water to said at least one soil washing tank comprises serially supplying said water to said plurality of soil washing tanks in a direction opposite to the flow of said small soil particles and said step of increasing the rate of shear between said small soil particles within said at least one washing tank comprises increasing the rate of shear between said small soil particles within each of said plurality of soil washing tanks.

5. The method according to claim 4 wherein said step of supplying said small soil particles to a plurality of soil washing tanks in conjunction with said step of supplying said water to said plurality of soil washing tanks and said step of increasing the rate of shear between said small soil particles causes the contaminant level in said water and the contaminant level in said small soil particles in each of said plurality of soil washing tanks to reach a general equilibrium.

6. The method according to claim 1 further comprising the step of removing said contaminants from said water to produce decontaminated water.

7. The method according to claim 6 further comprising the step of supplying said decontaminated water to said soil washing tank after said step of removing said contaminants from said water.

8. The method according to claim 1 wherein the step of creating turbulence within said at least one soil washing tank operates to desegregate said small soil particles.

9. The method according to claim 1 further comprising the step of mixing said small soil particles with water prior to supplying said small soil particles to said at least one soil washing tank.

* * * * *